FIG. I

INVENTORS: B. A. CRANE
J. A. GITHENS
BY R. C. Winter
ATTORNEY 3,391,390

INFORMATION STORAGE AND PROCESSING SYSTEM UTILIZING ASSOCIATIVE MEMORY

Bently A. Crane, Morris Plains, and John A. Githens, Morristown, N.J., assignors to Bell Telephone Laboratories, Incorporated, New York, N.Y., a corporation of New York Filed Sept. 9, 1964, Ser. No. 395,161
12 Claims. (Cl. 340—172.5)

ABSTRACT OF THE DISCLOSURE

An information storage and processing system utilizing a two-dimensional associative memory is provided. This memory comprises a two-dimensional array of storage cells, each cell in turn comprising a plurality of storage registers. In the first dimension or first array of cells, data words are stored on a bit-per-cell basis. That is, each bit of a data word is stored in a different one of the first array cells. Associated with each group of first array cells is a second dimension or second array cell such that each storage register of the second array cell is associated with a particular first array cell. Data words are stored in the second array cells on a word-per-cell basis. Data words may be transferred from each second array cell to the associated first array cell group and vice-versa. Storage of a word on a bit-per-cell basis has the advantage of providing control circuitry in each cell to act on the single corresponding bit of a stored word thus permitting action upon all bits of a word simultaneously.

This invention relates to information storage and retrieval systems, and more particularly to such systems in which retrieval is based on content rather than location.

Memory units in current use may be divided into two broad classifications according to the manner of gaining access to the stored information. Some memory units store information at predetermined locations without regard to the particular information being stored. Retrieval is then implemented by addressing a predetermined storage location in the memory. For reference purposes, such units will be designated direct access memory.

Another type of memory, referred to hereinafter as associative memory, matches or associates the stored information with retrieval data. Thus, in order to retrieve a stored information symbol, a corresponding symbol is applied simultaneously to each storage location or cell. If a match with a stored symbol is obtained in one or more of the cells, retrieval of data stored therein or adjacent thereto may be achieved. An example of such an associative memory is disclosed in C. Y. Lee application Ser. No. 190,856, filed Apr. 30, 1962, now Patent 3,185,965, issued May 25, 1965.

An important aspect of associative memory operation is the ability to propagate cell conditions to adjacent cells; for example, the application of a particular input symbol to the memory merely initiates the read out of information stored in cells adjacent to the one containing a matching symbol. Thus the presence of a match condition in a particular cell will trigger the activation of the cells which actually contain the desired information. It is certainly advantageous for the memory to perform this propagation rapidly.

Therefore, it is an object of this invention to improve the operation of information storage and retrieval systems.

It is another object of this invention to improve the operation of an associative type memory and more particularly to increase the speed of operation in such a system.

The advent of digital computers, with their ability to perform simple arithmetic operations at extremely high speed, has resulted in a considerable reduction in the time and expense involved in the performance of a wide range of computations. Ironically, the ever-increasing demand generated by this popularity, coupled with the physical limitations which appear to preclude any significant increase in the speed of operation of computer circuitry, are establishing an upper limit on the processing ability per unit time of digital computers.

The need for greater computing capacity can arise, for example, in the solution of lengthy mathematical problems. Typically, such problems can be reduced to a series of repeated operations, each sequence of repeated operations being delayed until a previous sequence has been completed. The result of this approach to computer operation is that the number of sequences involved in a particular problem does not have to be very large before the capacity of even the fastest available computers is dissipated. Recognizing these limitations, the feasibility of parallel systems and bulk processors which perform arithmetic and logical operations on a large number of quantities simultaneously is now under investigation. If the average size of the sequences of operations to be handled were large, such operations could be performed by a bulk processor at moderate speed in order to exceed the maximum capabilities of present machines.

It is, therefore, a further object of this invention to improve the speed and capacity of data processing equipment employing bulk processing techniques.

It is still another object of this invention to increase the flexibility of operation of an associative type memory and, more particularly, to permit its utilization as a bulk processor.

These and other objects of the invention are realized in accordance with one specific illustrative embodiment thereof by provision of a memory unit comprising a plurality of structurally identical storage cells, each capable of storing a symbol or bit of data and of communicating with adjacent cells.

As disclosed in the aforementioned C. Y. Lee patent, the associative memory comprises an array of identical cells, each cell consisting of data storage and control registers which collectively have the ability to store multiple element information. Such information may be utilized as data or for control purposes.

The principal logical operation performed in each cell is that of comparison in which the contents of the registers are compared with the input information received simultaneously by all cells in the memory. A positve comparison resultant may be utilized to activate adjacent cells.

These inherent storage and communication abilities of the individual cell permit the memory to perform three fundamental operations; viz., reading, writing and comparison. These basic operations result in a set of commands which are made up of variations of the basic operations. These commands include the match command in which a cell is activated if its contents match the input information. A variation of this command serves to activate a cell or string of cells adjacent to an active cell and having specified command attributes.

The arrangement in accordance with the aforementioned Lee patent is such that in order to perform the latter operation, designated propagation, the state of the control register comprises one input to the comparison circuitry in addition to the state of each data register and the input information.

In accordance with this invention, the circuitry is rearranged such that the state of the control register is combined with the output of the comparison circuitry. Such an arrangement has the important practical feature that in propagate operations the delay of the comparison circuit is not involved at every stage of propagation.

Therefore, it is a feature of this invention that an associative memory comprise circuitry for expediting the propagation of signals between adjacent cells. More particularly, it is a feature of this invention that the output signals of the control and comparison circuits in one cell each contribute directly to the generation of signals propagated to and through adjacent cells.

As further disclosed in the aforementioned C. Y. Lee patent, each cell in the associative memory comprises a plurality of data storage registers each capable of storing one binary digit or bit, the collective content of the data registers thus forming a multidigit binary word.

In accordance with another aspect of this invention, the manner of storing information in the associative memory is varied in order to provide an arrangement suitable for bulk processing involving arithmetic operations. Although arithmetic operations can be performed on data words stored in the manner disclosed by Lee in the aforementioned patent, the same operations are performed more efficiently when consecutive bits of a word are stored in consecutive cells; i.e., on a bit-per-cell basis. Such an arrangement of the stored data words has the advantage of providing control circuitry in each cell to act on the single corresponding bit of a stored word. This permits action upon all bits of a word simultaneously and when two words are stored adjacent one another in this manner, their corresponding bits can be acted upon simultaneously. Such an arrangement permits arithmetic operations to be performed on any number of stored word pairs where each pair is found in a different set of cells.

Therefore, it is another feature of this invention that each data word be stored in the associative memory such that each bit of the word is stored in a different cell.

The data format for such parallel execution of arithmetic operations is not as efficient as the arrangement disclosed in the aforementioned Lee patent in the performance of input, output and certain arithmetic operations. For this reason, in accordance with another aspect of this invention, a two-dimensional memory is provided. This arrangement comprises a first array of distinct groups of cells, each cell group in turn comprising a linear array of identical cells. These cell groups are used to store and process words, each word being stored on a bit-per-cell basis. A second array of cells stores words on a word-per-cell basis, each cell in the second array corresponding to a cell group in the first array. More particularly, each data register in a cell of the second array is common to and actually incorporated in a corresponding cell in the first array.

Control of the two arrays is interrelated. The fact that the second cell array stores words on a word-per-cell basis permits this array to be utilized in the performance of the input and output operations which such an arrangement is capable of performing most efficiently. Because of the interrelationship of the arrays, data is transferred readily between the two arrays and the second array serves as an access register to the first array.

It is, therefore, a further feature of this invention that an associative memory comprise individual cells arranged in two distinct arrays, the cells of one array containing elements common to corresponding cells in the other array.

More particularly, it is a feature of this invention that the cells of a first array be arranged in distinct groups, a distinct cell of the second array corresponding to each group of cells in the first array and having circuitry in common with each cell in the corresponding first array group.

A complete understanding of this invention and of the above-noted and other features thereof may be gained from consideration of the following detailed description with reference to the accompanying drawing, in which.

Figure 1:
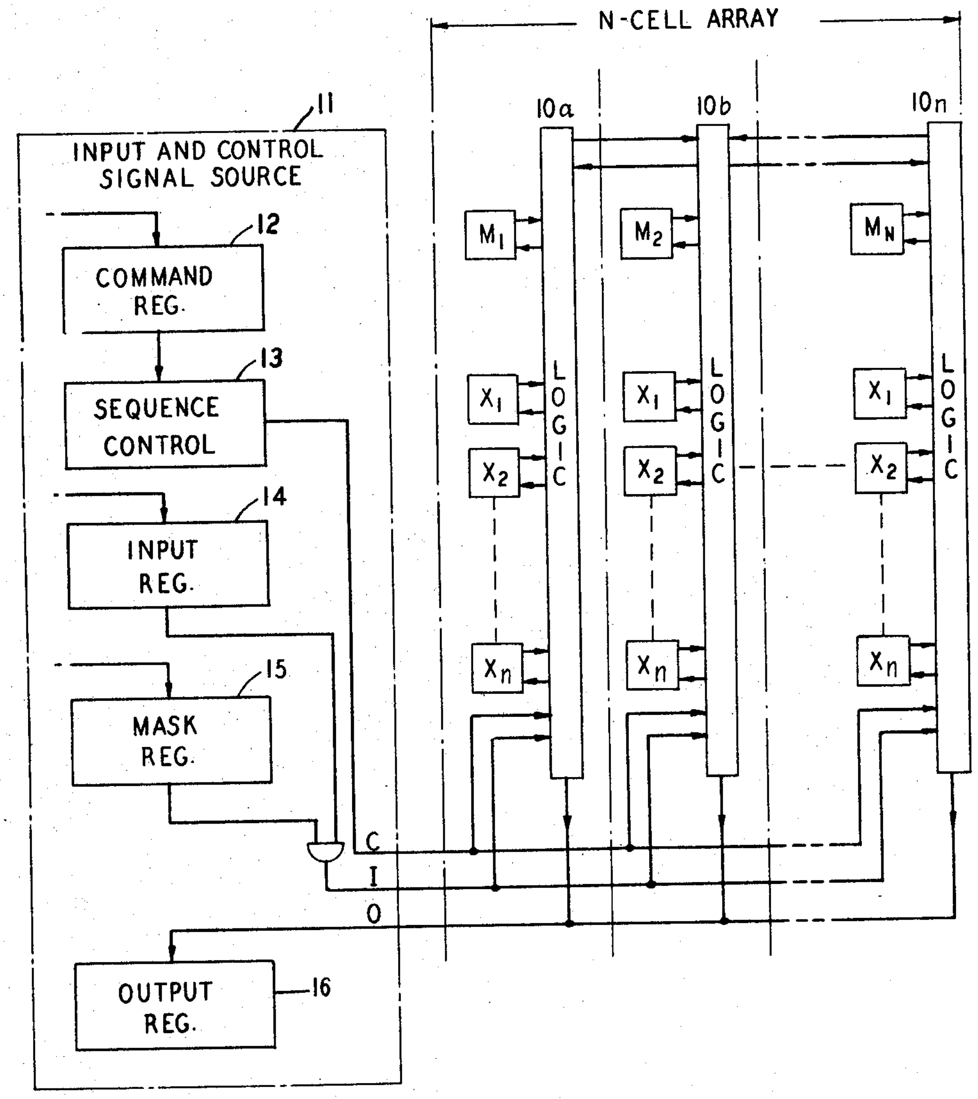
FIG. 1 is a simplified block diagram representation of an associative memory suitable for illustration of this invention.

Turning now to the drawing, an arrangement of identical celss in an associative memory is depicted in FIG. 1 operated in parallel under common control. Each identical cell 10*a*, 10*b* . . . 10*n* is essentially an $n$ bit storage register combined with logic circuits for controlling operations on the register's content and connected in parallel to a set of data input and command leads. Thus the arrangement forms a series network of interconnnected cells, with each cell connected to the succeeding and preceding cells in the network chain.

Each cell contains identical circuitry for facilitating storage, matching, propagation and retrieval operations; viz., $n$ data registers $X_1, X_2, \ldots X_n$; a match circuit M and control logic. Signals from an input and control signal source 11 are supplied to each cell over various leads designating the particular operation to be performed; whereupon, the content of each cell is either altered to store new data, compared with matching data, or directed to retrieve data stored therein. The cells are joined by propagate leads and, upon receipt of proper directives, propagate control signals in either direction to activate adjacent cells, thereby placing them in condition for a possible match of their content with the next applied signal.

Thus the array responds to three basic types of commands, MATCH, STORE, and READ, as directed by the input and control signal source 11 which comprises signal generation and timing circuitry well known in the art. A command to be executed is held in the command register 12 until it is translated into control signals by the sequence control 13. These signals, in turn, drive the control logic in all cells simultaneously via the common control lines C.

The MATCH command finds all cells, the contents of which match the content of the input register 14, and marks those cells by setting their match circuits M. A cell so marked is said to be "active." Every cell, the content of which does not match that of the input register, is "deactivated" by resetting its match circuit. This command is implemented by supplying the content of the input register 14 to all cells simultaneously via the input lines I. Each cell's logic then determines whether the pattern of inputs matches its content and either sets or resets the respective match circuit.

The MATCH command, therefore, provides a simultaneous search of all cells. The mask register 15 can be used to mask out bit positions of the input register 14. This enables searching a subset of data registers in every cell while disregarding the remaining data registers. For example, all bit positions of the input register 14 except those corresponding to $X_2$ and $X_3$ can be masked out, resulting in all cells in which the contents of the $X_2$ and $X_3$ registers agree with those bit positions being activated regardless of the contents of the other data registers.

The cell logic is such that the MATCH command can specify cell activity in its comparison pattern as well. This makes it possible to search only active cells, thereby finding a subset within a subset of cells. For example, all active cells not containing $X_2=0$, $X_3=1$ can be deactivated.

The cell logic also enables a directional MATCH command where a cell matching the comparison specification is not activated, but its nearest left or right neighbor is. Therefore, including cell activity in the comparison specification of a directional MATCH command enables a cell to transfer its activity to either of its two nearest neighbors.

In the STORE command, the content of the input register 14 is supplied to all cells simultaneously via the input lines I. The cell logic is designed to respond to two types of STORE commands, conditional and unconditional. With the conditional STORE only active cells are involved and the contents of inactive cells are not disturbed. With the unconditional STORE all cells store the input data, regardless of activity status. As in the MATCH command, the mask register 15 can be used to specify "don't cares" in any of the bit positions. Masking out a bit position in the input register 14 avoids disturbing the content of the corresponding data register in each cell.

The READ command retrieves the contents of an active cell and places it in the output register 16 via the output lines 0. Since all cells share common output lines, it is necessary to ensure that only one cell is active before reading. Otherwise the output register 16 will contain the logical OR of the contents of all active cells, and the contents of any one cell will be indistinguishable. A single active cell can be isolated through the use of MATCH commands.

A more complete disclosure of the basic associative memory structure and operation in accordance with these basic commands may be gained from consideration of the aforementioned Lee application.

*Cell structure*

Figure 2:
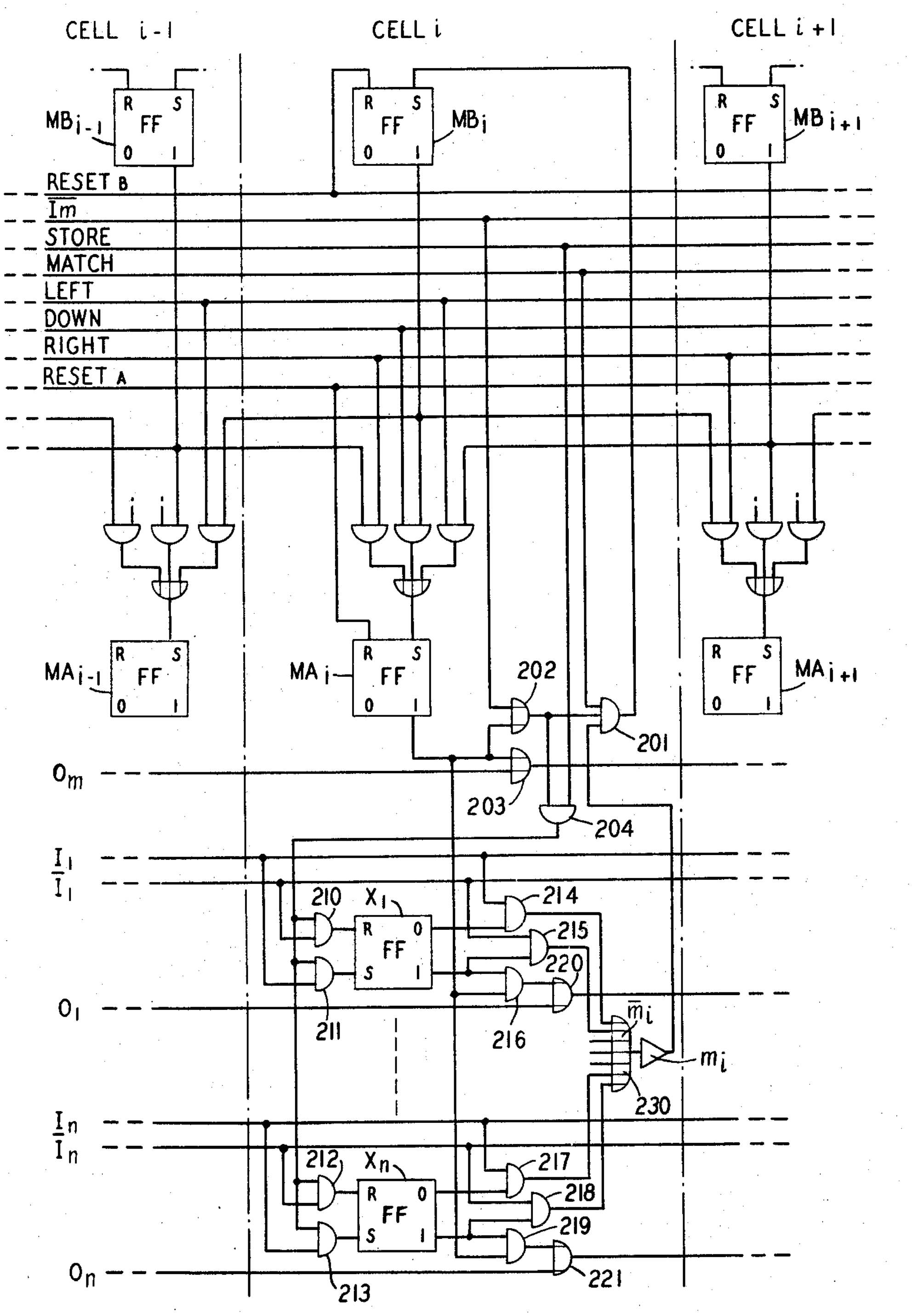
FIG. 2 is a schematic representation of one cell in the memory of FIG. 1 depicting in detail the circuitry required to perform the operations described in the aforementioned patent, with circuit variations to improve propagation time in accordance with the specific illustrative embodiment of this invention.

FIG. 2 shows the logical organization of an individual $n$-bit cell together with the eight control lines $2n$ input lines, and $n+1$ output lines common to all cells. Cell $i$ is shown in detail, and cells $i-1$ and $i+1$ are shown partially in order to indicate how cell activity can be transferred from one cell to another. The match flip-flop M is double-ranked to form match flip-flops MA and MB, thereby eliminating the possibility of race conditions in the directional MATCH commands. Flip-flop MA represents cell activity ("1" for active, "0" for inactive), and flip-flop MB serves as temporary storage for the result of a MATCH command. The result of a successful match ($MB=1$) is used to set one of the three MA flip-flops connected to MB. Which MA is set depends on which of the three control lines, LEFT, DOWN, or RIGHT, is pulsed. The LEFT and RIGHT lines are used in directional MATCH commands.

The basic cell operations, in order to execute the STORE, MATCH and READ commands, are the same as those disclosed in the aforementioned Lee patent, so that the description thereof presented herein will be sufficient only as background for an understanding of the propagation of information according to one aspect of this invention.

In MATCH commands the comparison of the contents of a cell's data flip-flops, $X_1, \ldots X_n$ with the signals on the input lines, $I_1, \bar{I}_1, \ldots \bar{I}_n, \bar{I}_n$, is performed by AND gates 214, 215, . . . 217, 218. These $2n$ AND gates connect to OR gate 230 so that a mismatch in one or more of the data flip-flops produces a signal $\overline{m}_i=1$. Not caring about the content of a data flip-flop is accomplished by not pulsing either of its input lines. Signal $m_i$, the inversion of $\overline{m}_i$, is therefore "1" only when no mismatches occur, and is an input to AND gate 201 to the right of the MA flip-flop in FIG. 2. Another input to AND gate 201 is through OR gate 202, the inputs of which are the $MA_i$ flip-flop and the $\bar{I}_m$ control line. This arrangement allows specifying cell activity in the matching pattern. Not caring about cell activity is accomplished by pulsing the $\bar{I}_m$ control line. Pulsing the MATCH control line, the third input to AND gate 201 sets the $MB_i$ flip-flop if a successful match has occurred.

In STORE commands AND gates 210, 211, . . . 212, 213 to the left of the data flip-flops $X_1$ through $X_n$ control the transfer of signals on the input lines to the data flip-flops. In the conditional STORE command a signal on the STORE control line is gated by the $MA_i$ flip-flop via OR gate 202 and AND gate 204, causing only active cells to store the input data. In the unconditional STORE command the $\bar{I}_m$ control line is also pulsed, causing both active and inactive cells to store the input data. In both types of STORE commands those data flip-flops whose contents are to remain undisturbed do not have signals on either of their input lines.

When a cell is active, each of its set data flip-flops puts an output signal on its respective output line which it shares with corresponding data flip-flops in all other cells through the corresponding OR gates such as 220 and 221 in FIG. 2. The cells need not receive any control signals; therefore, to respond to a READ command, it is sufficient to inspect the $n+1$ output lines coming out of the array. The necessity for having only one active cell when reading out the contents of data flip-flops is evident. An input pattern must accompany the MATCH and STORE commands in order to specify which cell flip-flops are to be operated upon.

The manner of executing the PROPAGATE command provides a departure from the aforementioned Lee application. This command can be viewed as an extended directional MATCH command by which an already active cell can propagate its activity through "strings" of adjoining cells whose contents match the input pattern specified with the command. It says, in effect, "Activate all cells between an already active cell and the first cell to its left (right) that does not match the input pattern." And it is accomplished by the following sequence of commands:

RESET B,
MATCH$\cdot$($I_i$=don't care),
MATCH$\cdot$LEFT (RIGHT)$\cdot$($I_i$), RESET A, DOWN.

In the control and input signal sequence, the first set of input signals, ($I_i$=don't care), causes the signal $m_i=1$ to appear at the output of OR gate 230 in all cells; but since $\bar{I}_m$ is not pulsed, the $MB_i$ flip-flop of only already active cells is set to "1." The second set of input signals ($I_i$) then causes only those cells whose contents match the inputs to have $m=1$. Therefore, simultaneous application of the MATCH and LEFT (RIGHT) control signals causes the activity condition to be stored in the $MB_i$ flip-flop of an originally active cell followed by those cells whose contents match the input pattern. An equally useful PROPAGATE command can be formed by applying RESET A and LEFT (RIGHT) as the final control signals. This causes the string of active cells to be displaced one cell to the left (right).

The basic distinction from the Lee arrangement involves the manner in which the match flip-flop $MA_i$ enters into the comparison operation. In order to propagate information from one cell to another, the data contained in a cell is matched against input information applied simultaneously to all of the cells in the memory. If a match is realized, the output of the comparison circuit which is provided at the output of OR gate 230 in cell $i$ is applied to the match flip-flop $MA_{i+1}$ via AND gate 201 and flip-flop $MB_i$. If the match control signal which initiates the propagation in this instance is maintained somewhat longer than the longest propagation expected, any matches existing in the array of cells will propagate in the predetermined direction, making the sequence of cells encountered in this propagation active so long as their content matches the input data.

In the cell illustrated in the Lee patent, the state of the match flip-flop $MA_i$ is one of the inputs to the comparison circuit. Due to this arrangement, the delay of the comparison circuit is involved at every state of propagation. Thus, in order to propagate information, the match control signal and the appropriate input data are applied to the memory. If the input data matches the stored data, the comparison output will set the match flip-flop in the adjacent cell. However, the match flip-flop itself enters into the comparison operation since its output comprises one input to the comparison circuit. Thus, each cell must await the outcome of the comparison in a preceding cell, and this delay becomes critical when long propagation operations are involved.

In accordance with our invention, as illustrated in FIG. 2, the state of the match flip-flop $MA_i$ is combined with the comparison circuit output in AND gate 201. The output of AND gate 201 in turn sets flip-flop $MB_i$ and the condition of this flip-flop is propagated to the flip-flop MA in an adjacent cell. Thus, logically, the result is the same as that disclosed in the Lee patent.

*Data format for bulk processing*

The associative memory was originally conceived as a means for storing and retrieving variable-length strings of alphanumeric characters. As such, each cell stores one character, and the content of a string of consecutive cells constitutes a useful piece of information. The information strings are separated by cells containing special "punctuation" characters. For example, sets of four strings might each consist of a telephone subscriber's last name, initials, address, and directory number. Retrieval of a particular subscriber's directory number, then, would be done by performing a sequence of commands using the successive characters of last name, initials, et cetera, until only one cell in the entire memory is active. The characters following that active cell can then be read out one at a time.

Figure 3:
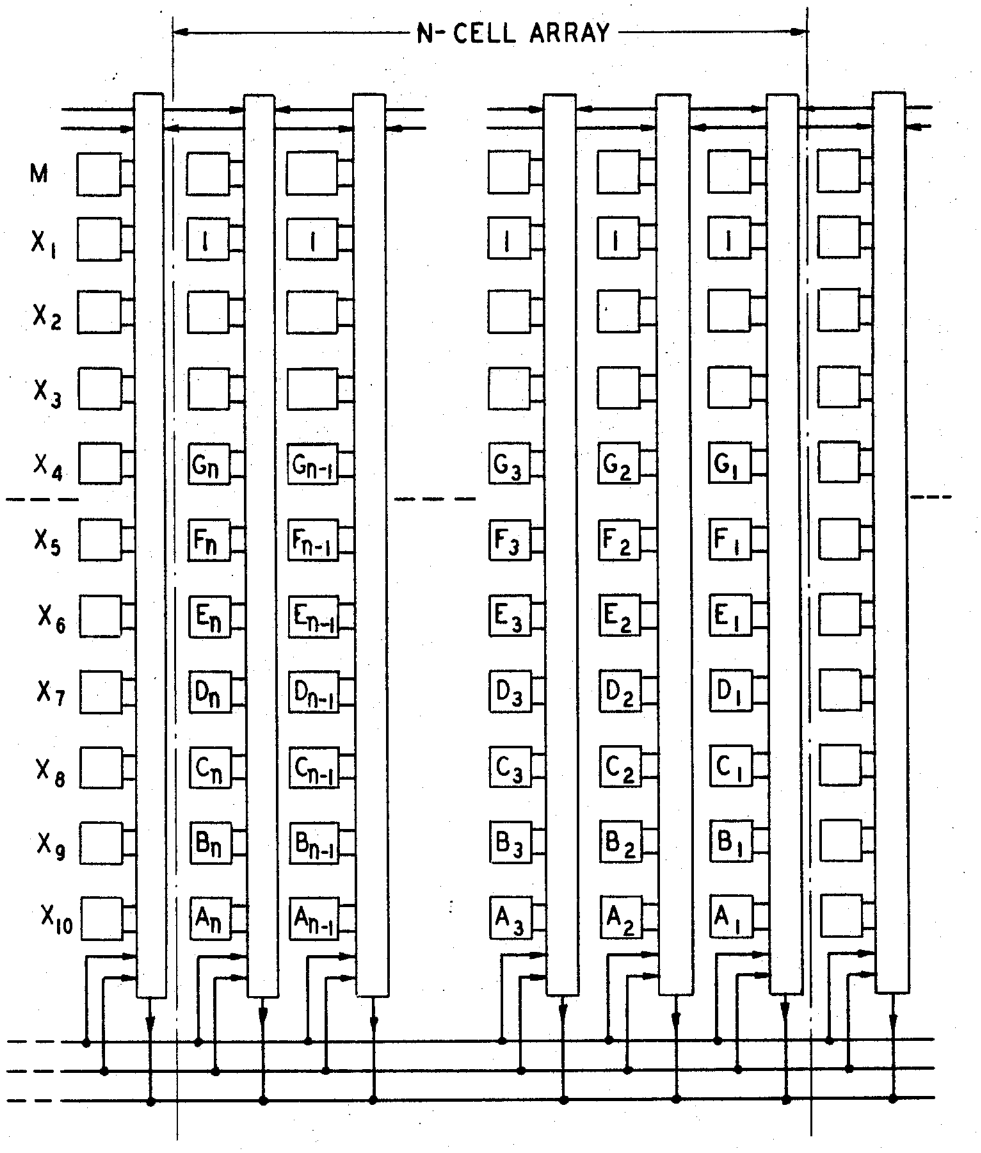
FIG. 3 is a representation in block form of a plurality of cells containing data organized for bulk processing in accordance with the illustrative embodiment of this invention.

Although arithmetic operations can be performed on data words stored in this manner; i.e., on a word-per-cell basis, these same operations may be accomplished far more efficiently in accordance with this invention by storing consecutive bits of a word in consecutive cells; i.e., on a bit-per-cell basis. This type of storage is illustrated in FIG. 3 where seven $n$-bit words, A, B, . . . , G, are stored in $n$ consecutive cells. Data flip-flops $X_1$, $X_2$, and $X_3$ are shown as being reserved in each cell for control purposes. For example, $X_1=1$ in a given cell could mark that cell as containing bits of words to be operated upon.

The reason for storing data words in this manner is that one match flip-flop is available to each bit of a word. This allows searching all bits of a word simultaneously, and when two words are stored side-by-side in this manner, their corresponding bits can be simultaneously searched. As will be seen, this enables arithmetic operations to be performed on any number of such pairs, where each pair is in a different set of cells, on a parallel-by-word, parallel-by-bit basis.

A simple addition operation serves to illustrate how a linear array of cells can be used to perform an arithmetic operation on many sets of data simultaneously. Suppose in each group the data word stored in data flip-flops $X_8$ is to be added to the word, in data flip-flops $X_9$. Assume these words to be binary numbers with their least significant bit to the right. The addition is to be performed on all groups of data whose cells are marked by having $X_1=1$. This marking could be the result of a previous sequence of operations which used the associative properties of the array to identify those data groups which are to take part in this addition operation.

A sequence of commands, a program, for performing the addition is given below. Associated with each command is an input pattern which specifies the bit positions which enter into the operation and their value. Bit positions not specified are marked "don't care" and do not enter into the operation. Following the program is a description of what each command does. Assume that bit position $X_2$, which is used for temporary storage, is cleared to the zero state:

CLEAR MATCH LEFT ($X_1=1$, $X_8=0$, $X_9=0$)

Activate the next cell to the left of each cell containing a matching pattern and deactivate all other cells. (This command consists of the basic commands RESET B, MATCH$\cdot[I_1, \bar{I}_8, \bar{I}_9, \bar{I}_m]$, RESET A LEFT.)

STORE CONDITIONALLY ($X_2=1$)

Store the input pattern in all active cells.

CLEAR MATCH LEFT ($X_1=1$, $X_8=1$, $X_9=1$)

PROPAGATE LEFT ($X_1=1$, $X_2=0$)

Activate all cells between an already active cell and the first cell to its left that does not match the input pattern.

STORE UNCONDITIONALLY ($X_2=0$)

Store the input pattern in all cells.

STORE CONDITIONALLY ($X_2=1$)

Store the input pattern in all active cells.

CLEAR MATCH ($X_1=1$, $X_2=0$, $X_8=0$, $X_9=1$)

Activate all cells containing the input pattern and deactivate all others. (This command consists of the basic commands RESET B, MATCH$\cdot[I_1, \bar{I}_2, \bar{I}_8, \bar{I}_9, \bar{I}_m]$, RESET A, DOWN.)

MATCH ($X_1=1$, $X_2=0$, $X_8=1$, $X_9=0$)

Activate all cells containing the input pattern.

MATCH ($X_1=1$, $X_2=1$, $X_8=0$, $X_9=0$)
MATCH ($X_1=1$, $X_2=1$, $X_8=1$, $X_9=1$)

The approach in this addition program is to first generate the carry input to each digit position (cell) and, then, using associative techniques, to determine the sum digits. The carry inputs are generated in the first four operations by locating the addend-augend pairs of "1,1" and "0,0". They can be considered "carry generators" and "carry inhibitors," respectively. Carries are then propagated, starting with carry generators, until the carry propagation is annihilated by a carry inhibitor.

Thus, the first operation, CLEAR MATCH LEFT, searches the array for those cells in the marked groups ($X_1=1$) that store carry inhibitors ($X_8=0$, $X_9=0$). This results in the match flip-flops being set in the cells to the left of those cells whose contents match the input pattern. This result is temporarily stored in position $X_2$ by the second operation, STORE CONDITIONALLY, to free the match flip-flops for use in the next operation. The third operation, again a CLEAR MATCH LEFT, searches for the carry generators and activates the cells to their left.

At this point the match flip-flops store the start of the carry chains (the carry generators mapped into carry input terms by the MATCH LEFT command), and these carry chains should activate cells to their left until carry inhibitors are encountered. This is accomplished by the fourth operation, PROPAGATE LEFT. Note the input pattern specified for this operation ($X_1=1$, $X_2=0$). This means that starting at any match flip-flop in the set condition ($M=1$) the cells to its left will be activated in sequence as long as they belong to the marked set ($X_1=1$) and they do not store a carry inhibition ($X_2=0$). In this manner, carry propagation is accomplished. The result is that the match flip-flop is set in all cells in which the carry input is "1."

In the fifth and sixth operations, STORE UNCONDITIONALLY and STORE CONDITIONALLY, position $X_2$ is cleared and the carry input is stored, freeing the match flip-flops for other uses. The sum digits can now be determined. The following four match operations search the marked groups for those addend, augend, and carry input combinations that produce sum digits of "1." The four input patterns correspond to the four entries that produce sum digits of "1" in an addition truth table. Thus, the four match operations build up in the match flip-flops the union of sets corresponding to the desired sum. This completes the addition operation, leaving the sum stored in the match flip-flops. The result can then be used as desired; it might, for example, be stored in one of the bit positions or used to determine a subset based on the sign of the result.

It is important to note what has been accomplished in performing this operation. The addition was performed on two components of all members of the designated set of data groups. This set could be quite large; it could, in fact, include all of the stored data groups. Thus, the associative memory provides the capability for parallel-by-bit, parallel-by-word operations. The duration of these operations is logically independent of the number of members in the sets being processed. The performance of these operations with moderate speed on a fairly large number of data group sets permits the effective addition speed to exceed that of today's fastest computers.

The ability to do bulk addition is interesting; but to be truly useful, the associative memory must have the capability to perform other arithmetic and logical operations. It should be clear that bulk subtraction can be performed in the same manner as above. In fact, the sequence of commands is exactly the same for subtraction; only the patterns for the first and third operations need be changed (to $X_1=1$, $X_8=1$, $X_9=0$ and $X_1=1$, $X_8=0$, $X_9=1$, respectively) to realize the difference $X_8-X_9$.

Shifting of variables is easily accomplished. The sequence,

CLEAR MATCH $(X_1=1, X_j=1)$
STORE CONDITIONALLY $(X_j=0)$
CLEAR MATCH LEFT (RIGHT) $(M=1)$
STORE CONDITIONALLY $(X_j=1)$ shifts the quantity $X_j$, in the subset marked by $X_1=1$, one place to the left (right).

Thus, the associative memory according to our invention has the capability of parallel-by-bit, parallel-by-word addition, subtraction, and shifting. It is well established that given these abilities, any arithmetic operations can be performed.

*Two-dimensional array*

Figure 4:
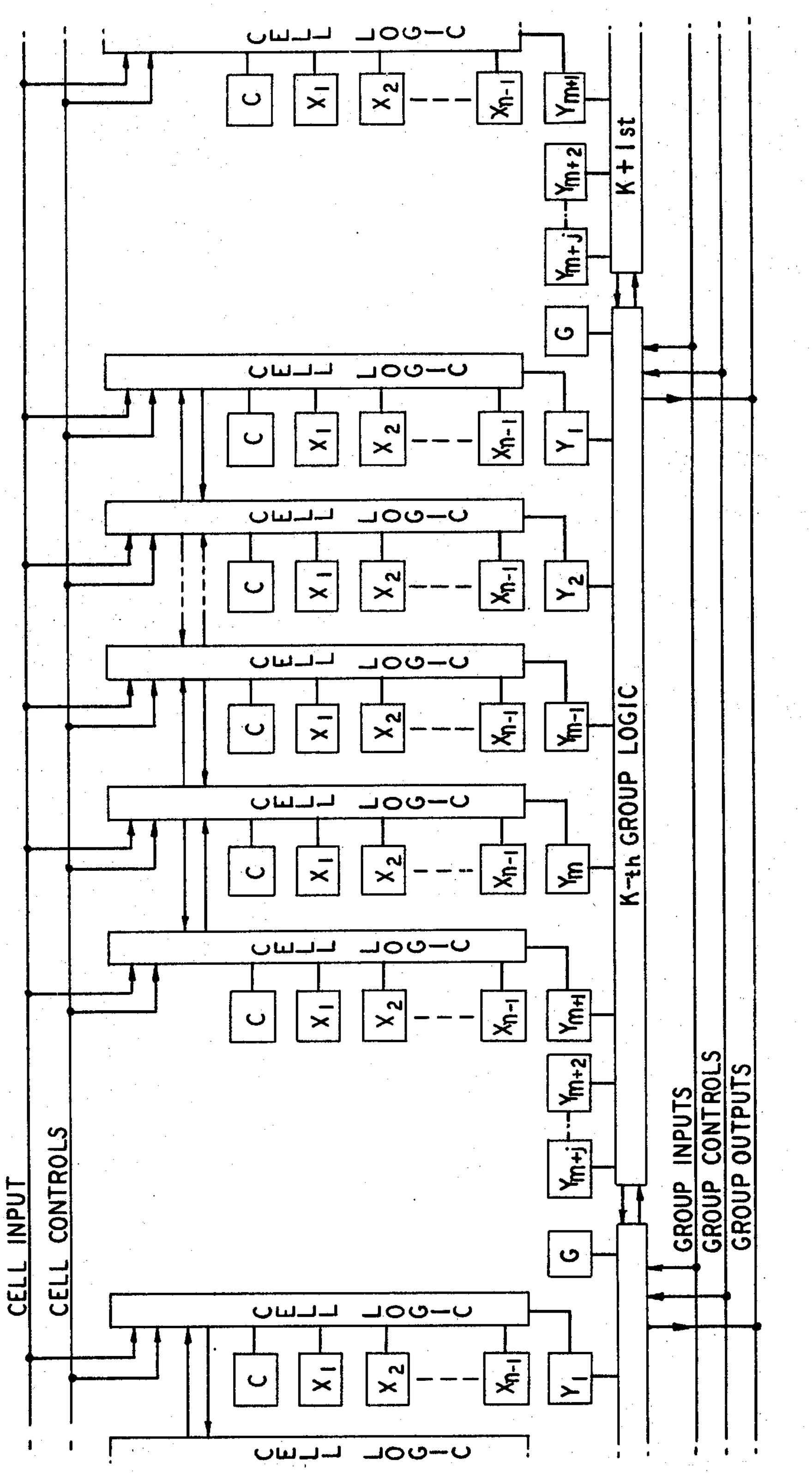
FIG. 4 is a block diagram representation of a two-dimensional associative memory comprising first and second cell arrays in accordance with the illustrative embodiment of this invention.

The linear array of cells in the memory just described is a very general facility. The same structure can be used for information retrieval, list processing, and bulk processing applications. The structure permits variable field operations with a considerable flexibility of format. However, input, output, and certain arithmetic operations are rather awkward in this organization. In accordance with another aspect of our invention, a second memory form is capable of performing all of the foregoing operations expeditiously; viz., parallel-by-bit input, output, and parallel comparison-type operations. This form of array, as illustrated in FIG. 4, comprises a linear array of identical units called cell groups. Each cell group, in turn, is a linear array of identical cells which will be called X cells. Each cell group also has one cell that contains one data flip-flop of each of the X cells in that cell group. This cell will be called a Y cell. Each Y cell also contains flip-flops which are not contained in X cells. Thus the memory is referred to hereinafter as the two-dimensional memory.

FIG. 4 shows the $k$th cell group of an M-group array. As shown, it consists of $m+1$ X cells containing $n$ data flip-flops each. The $n-1$ data flip-flops of each X cell that are not shared with the Y cell are labeled $X_1, X_2, \ldots, X_{n-1}$, and the match flip-flop of each X cell is labeled C. The $m+j$ flip-flops of the Y cell are labeled $Y_{m+j}, \ldots, Y_{m+1}, Y_m, \ldots, Y_1$, and the match flip-flop of the Y cell is labeled G. The $m+1$ data flip-flops common to the Y cell and the X cells can be referred to in two ways. In the input patterns of X cell commands they will be collectively called Y flip-flops, and in Y cell commands they will be individually specified.

The X cells are used to store and process words. Words are stored in the X cells on a bit-per-cell basis, data flip-flop $X_1$ of each of the X cells containing a different bit of the same word. The rightmost X cell contains the least significant bit, and the most significant bit is contained in the third X cell from the left. The second X cell from the left stores the sign bit, and the leftmost X cell is kept empty for such things as overflow detection.

The Y cell, on the other hand, stores words on a word-per-cell basis, the least significant bit being in flip-flop $Y_1$, the most significant bit in $Y_{m-1}$, and the sign bit in $Y_m$. As will be seen, it is a simple matter to transfer a word from the X cells to the Y cell in the same cell group; and transferring back to the X cells is equally simple. Therefore, any word can be conveniently represented on either a bit-per-cell basis in an X cell or on a word-per-cell basis in a Y cell. Since input and output can be done most conveniently on a word-per-cell basis the primary function of the Y cell will be serve as an access register to the X cells.

In describing how this assemblage of X cells and Y cells is controlled, it is convenient to regard the two-dimensional memory as two linear arrays of cells. One array consists of the Y cells and the other consists of the X cells. These two arrays may be thought of as being orthogonal with their point of contact being the data flip-flops common to both X cells and Y cells.

The Y cell array is essentially identical to the basic structure previously described. Its set of commands enables the three basic operations of matching, storing, and reading. The X cell array is also identical to the basic structure except in the two following ways. First, the linear array of X cells is segmented into groups of X cells. This segmentation consists of deleting the circuits that allow transfer of activity between the rightmost X cell in one group and the leftmost X cell in the next group to the right. Second, its command set enables only the two basic functions of matching and storing; all reading is done from the Y cells. Except for these two differences, and the interaction with the Y cells, the X cell array is identical to the basic memory structure.

The X cell and Y cell arrays interact via the match and store commands. The Y cells can be written into by either of two methods. One method is to write directly into the Y cell flip-flops by means of the Y cell input lines. This is the way that words would be read into the cell groups from an exterior input register. The other method is to use the conditional STORE command, writing into flip-flop Y of active X cells via the X cell input line. This is the way that a word would be transferred from the X cells to the Y cell in the same cell group.

The interaction in the matching commands arises from the ability to specify match flip-flop activity in the matching pattern. In the X cell MATCH commands, both X cell activity and the activity of the Y cell in the same cell group can be specified. This, for example, allows simultaneous activation of all X cells in a cell group containing an active Y cell. The dual of this function is a command which activates a Y cell if one or more of the X cells in its cell group are active. In all other Y cell matching commands, however, the activity of the X cell match flip-flops cannot be specified.

The command format is basically that described for arithmetic operations in a linear array except that the last letter of the operation specifies whether the command applies to X or Y cells. Also, in X cell command patterns the activity of the Y cell MATCH flip-flop, G, in the same cell group can be specified as well as that of the X cell match flip-flop C.

*Cell group isolation in two-dimensional memory*

The two-dimensional memory is organized so that all cell groups satisfying a given criterion are operated on simultaneously. It is sometimes required, however, to operate on only one of these cell groups. To do this requires the application of a second criterion that can be satisfied by one and only one of the cell groups. Either of two criteria can be used for this isolation procedure; one is based on position and the other on content.

In a collection of cell groups having identical contents each cell group has a unique position in the linear array with respect to the others. For example, only one cell group in the collection is the leftmost. To see how this property can be used for isolation, consider a collection of cell groups having their Y cell flip-flop $Y_{m+2}$ set to "1." These cell groups are isolated, one at a time, by the following routine:

1. CLEAR ACTIVATE LEFTMOST Y

Deactivate all Y cells, and then activate the leftmost (*o*th) Y cell.

2. PROPAGATE RIGHT Y ($Y_{m+2}=0$)

Propagate Y cell activity to the right until a Y cell containing $Y_{m+2}=1$ is encountered.

3. CLEAR MATCH RIGHT Y ($G=1$)

Shift activity one Y cell to the right.

4. CLEAR MATCH Y ($Y_{m+2}=1$; $G=1$)

Only one active Y cell contains $Y_{m+2}=1$. Deactivate all others.

The cell group containing this active Y cell can now be operated on without interfering with the other cell groups containing $Y_{m+2}=1$. The commands need only be conditional on Y cell activity. Upon completion of operations, the next cell group marked by $Y_{m+2}=1$ can be isolated by repeating steps 2, 3, and 4. All such marked cell groups will have been isolated when the rightmost ($M+1$st) Y cell becomes active.

In some applications it may be necessary to quickly find a vacant cell group for receiving real-time input data. An alternative procedure for achieving this result involves the use of a step-up, step-down counter in the exterior control to assign a unique address to each vacant cell group. Assume that the Y cell in each vacant cell group contains $Y_{m+2}=1$ and a unique address supplied to it by the counter. Finding a vacant cell group, then, consists of executing the command CLEAR MATCH Y ($Y_{m+2}=1$, $Y_k$, $Y_{k-1}$, . . ., $Y_1$)

where $Y_k$, $Y_{k-1}$, . . ., $Y_1$ represents the counter's contents. The counter is then decremented in preparation for finding another vacant cell group. How addresses are assigned to vacant cell groups depends on how many cell groups are vacated at a time. When one cell group is vacated at a time it can be immediately addressed by incrementing the counter and storing the counter's contents together with $Y_{m+2}=1$ in its Y cell. When a number of cell groups are vacated at one time, they are temporarily marked by storing $Y_{m+2}=1$ and $$Y_k=Y_{k-1}= \ldots =Y_1=0$$

in their Y cells. Then, whenever the supply of addressed vacant cells becomes too low, as indicated by the counter, the previously described positional isolation routine is used in conjunction with the counter to address the temporarily marked cell groups one at a time.

*Input to two-dimensional memory*

The general input procedure consists of copying a word stored in an external input register into specified X cell flip-flops in all appropriately marked cell groups. The word is first written into the Y cell of each marked cell group. From there it is copied into the specified X cell flip-flops where it is stored on a bit-per-cell basis. Use of the Y cell enables this process to be parallel by bit.

Assume that the cell groups which are to receive an input word are marked by $Y_{m+2}=1$. This mark would be the result of some other operation (e.g., isolation). The following routine stores the input word in the $X_i$ flip-flops of these cell groups:

(1) Deactivate all Y cells and then activate marked Y cells.

CLEAR MATCH Y ($Y_{m+2}=1$)

(2) Write the input word into all active Y cells.

STORE CONDITIONALLY Y ($Y_m$, $Y_{m-1}$, . . . , $Y_1$)

(3) Copy "1's" into $X_i$ flip-flops.

CLEAR MATCH X ($Y=1$; $G=1$)

STORE CONDITIONALLY X ($X_i=1$)

(4) Copy "0's" into $X_i$ flip-flops.

CLEAR MATCH X ($Y=0$; $G=1$)

STORE CONDITIONALLY X ($X_i=0$)

Execution of these six commands stores the input word in the appropriate $X_i$ flip-flops. Note that there is no interference with previously stored information except in the $X_i$ flip-flops and the Y cell of each marked cell group.

*Output from two-dimensional memory*

Reading a word out of a cell group is essentially the reverse of the input process. Each word stored in the $X_i$ flip-flops of an appropriately marked cell group (say by $Y_{m+2}=1$) is first copied into its respective Y cell as follows:

(1) Deactivate all Y cells and then activate marked Y cells.

CLEAR MATCH Y ($Y_{m+2}=1$)

(2) Copy "1's" into active Y cells.

CLEAR MATCH X ($X_i=1$; $G=1$)

STORE CONDITIONALLY X ($Y=1$)

(3) Copy "0's" into active Y cells.

CLEAR MATCH X ($X_i=0$; $G=1$)

STORE CONDITIONALLY X ($Y=0$)

There is a problem, however, at this point if more than one word is to be read out. Since all Y cells share common output lines, attempting to read out more than one word at a time causes the output register to contain the logical OR of all outputs, making any one word indistinguishable. Therefore, in the case of multiple output words, the previously described isolation procedure is necessary.

It could be used here as steps 4 through 7 in the routine. Step 8 would then be:

8. Read out contents of the active Y cell.

READ Y

Steps 2 through 8 would be repeated until all words are read out.

*Comparison in two-dimensional memory*

Comparing a set of words with a single, exterior word as a parallel-by-word, serial-by-bit process. Assume each of the words to be compared to be in the $X_i$ flip-flops of a different cell group and that each such cell group is marked by $Y_{m+2}=1$. Assume further, for simplicity, that all words are positive. The following routine, then, finds all words in the comparison set that are equal to or greater than the external comparison word:

(1) Load exterior comparison word into all Y cells containing $Y_{m+2}=1$.

CLEAR MATCH Y ($Y_{m+2}=1$)

STORE CONDITIONALLY Y ($Y_m$, $Y_{m-1}$, . . . , $Y_1$)

(2) Deactivate the Y cells in cell groups where there is no X cell containing $X_1=0$, $Y=1$ to the left of the leftmost X cell containing $X_1=1$, $Y=0$.

CLEAR MATCH X ($X_1=1$, $Y=0$; $G=1$)

PROPAGATE RIGHT X

STORE CONDITIONALLY X ($Y=0$)

CLEAR MATCH X ($X_1=0$, $Y=1$; $G=1$)

CLEAR TRANSFER ACTIVITY Y ($C=1$)

(3) All active Y cells are in cell groups containing words not meeting the comparison specifications. Erase their marker bit.

STORE CONDITIONALLY Y ($Y_{m+2}=0$)

This routine can be used to find all words equal to or less than the comparison word by complementing the values of $X_1$ and Y in step 2. Execution of eight commands is required, one of which is a propagate command that can be through as many as $m-1$ cells for words of $m$ bits. The total execution time is therefore $(m+6)\tau$.

*Addition in two-dimensional array*

Although the addition routine described for the single array memory is also suitable for this memory, it is instructive to consider another version here. This routine provides for accumulative addition where the augend is the result of previous additions and each addend need not be saved. Provision for overflow detection is also made.

Let those cell groups containing pairs to be added be marked by $Y_{m+2}=1$ and let each addend be stored in the $X_1$ flip-flops and each augend in the $X_2$ flip-flops. The accumulative addition routine, then, is as follows:

(1) Find cell groups containing pairs to be added.

CLEAR MATCH Y ($Y_{m+2}=1$)

(2) Form partial sum in $X_2$ flip-flops.

CLEAR MATCH X ($X_1=1$, $X_2=0$; $G=1$)

STORE MATCH X ($X_1=1$, $X_2=$;0 $G=1$)

CLEAR MATCH X ($X_1=1$, $X_2=1$; $G=1$)

STORE CONDITIONALLY X ($X_1=0$, $X_2=0$)

(3) Ripple carries.

PROPAGATE LEFT X ($X_1=0$, $X_2=1$)

CLEAR MATCH LEFT X ($C=1$)

STORE CONDITIONALLY X ($X_1=1$)

(4) Add carries to partial sum, storing final sum in $X_2$ flip-flops.

CLEAR MATCH X ($X_1=1$, $X_2=1$; $G=1$)

STORE CONDITIONALLY X ($X_1=0$, $X_2=0$)

CLEAR MATCH X ($X_1=1$, $X_2=0$; $G=1$)

STORE CONDITIONALLY ($X_1=0$, $X_2=1$)

Note that the $X_1$ flip-flops are cleared in readiness for the next addend, and that an overflow is indicated by the $X_2$ flip-flop in the leftmost X cell containing a 1.

Execution of twelve commands is required. One of these commands can require a propagation over $m$ cells for $m$-bit words. The total execution time is therefore $(m+11)\tau$.

*Multiplication in two-dimensional memory*

Multiplication of two $m$-bit words to obtain a single precision, $m$-bit product is basically a process consisting of $m$ additions alternated with $m$ partial product shifts. Here it is not necessary to ripple the carries through until after the final addition. This "stored carry" technique reduces the number of propagate commands required, therefore decreasing the required execution time.

Let those cell groups containing multiplicand-multiplier pairs be marked by having $Y_{m+2}=1$. The $X_1$ flip-flops contain the $m$-bit multiplicand, the $X_2$ flip-flops contain the $m$-bit multiplier, and the resulting $m$-bit product will be stored in the $X_3$ flip-flops. The $X_4$ flip-flops will be used for carry storage. The routine for simultaneously forming the respective products of any number of such pairs is as follows:

(1) Set exterior index register $k$ to 0. Find cell groups containing pairs to be multiplied and clear flip-flops $X_3$, $X_4$, and Y. $T=3\tau$.

(2) Find cell groups containing negative multipliers and mark them by setting $Y_{m+3}=1$. $T=6\tau$.

(3) Form 2's complements of multiplicand and multiplier in cell groups marked by $Y_{m+3}=1$. $T=(2m+13)\tau$.

(4) Erase any overflows resulting from complementing and find all cell groups containing $Y_{m+2}=1$. $T=3\tau$.

(5) Increase $k$ by 1. Add carries in $X_4$ flip-flops to partial product in $X_3$ flip-flops in all cell groups marked by $Y_{m+2}=1$. $T=4\tau$.

(6) Find cell groups where the $k$th multiplier bit is a "1," and add multiplicand to partial product. $T=9\tau$.

(7) Shift all partial products one bit to right, placing "1" in sign bit of negative products. $T=8\tau$.

(8) Does $k=m$? If no, go to 5; if yes, ripple carries in flip-flop $X_4$ to form final product in flip-flops $X_3$.

$$T=(m+10)\tau$$

At this point each of the $m$-bit products is stored in the $X_3$ flip-flops of its respective cell groups. Steps 1, 2, 3, 4, and 8 were each executed once, and steps 5, 6, and 7 were each executed $m$ times, giving a total execution time of $(24m+35)\tau$. If it is required to restore all multipliers and multiplicands to their original form, then steps 3 and 4 must be repeated, giving an additional execution time of $(2m+16)\tau$.

It should be noted that this routine deals with the most general case, all multipliers and all multiplicands can be different. Squaring and multiplying by a common multiplier would be degenerate cases for which routines requiring a shorter execution time can be written.

*Matrix multiplication*

This routine is included as an example of how some of the previous routines can be combined to handle a complete problem. It also serves as a striking example of the two-dimensional memory's efficiency in bulk processing.

Multiplication of an $mxn$ matrix by an $nxp$ matrix requires $mnp$ separate multiplications and $mp(n-1)$ separate additions. These numbers become formidably large for even moderate values of $m$, $n$, and $p$. With the two-dimensional memory, however, only $n$ separate executions of a combined multiplication and addition routine are required.

Let the two matrices to be multiplied be A and B, and the resulting product matrix be C. The elements of A, B, and C are $a_{ij}$, $b_{ij}$, and $c_{ij}$ respectively, and are related by $$c_{ij}=\sum_{k=1}^{n} a_{ik}b_{kj}$$

This expression gives some insight as to how the elements should be stored to take advantage of the parallel processing capability. Let each element of C be formed in a separate cell group; the cell group containing element $c_{ij}$ will be called $G_{ij}$. Then, for multiplication $k$, cell group $G_{ij}$ must receive elements $a_{ik}$ and $b_{kj}$, multiply them, and add the resulting product to the sum of previously formed products.

Two advantages of the two-dimensional memory are evident in this procedure. First, the same element can be simultaneously loaded into a number of cell groups. For example, in the fourth multiplication $a_{24}$ must be loaded into cell groups $G_{21}$, $G_{22}$, . . ., $G_{2p}$. Second, once all cell groups are loaded, the pairs can be simultaneously multiplied and the resulting products simultaneously added to the existing sums. Not all operations, however, can be completely parallel. The input process is partly serial since only certain cell groups are simultaneously written into. The output process is completely serial since the position of each element in the product matrix must be known as well as its value. These serial operations necessitate giving each of the cell groups a unique label.

Let cell group $G_{ij}$ be labeled by storing the value of $i$ in the $X_1$ flip-flops of the X cells in the left half of the cell group and the value of $j$ in the $X_1$ flip-flops of the right half. In each cell group the $X_2$ flip-flops will be used to accumulate the value of $c_{ij}$; and the $X_3$ and $X_4$ flip-flops will store respectively the values of $a_{ik}$ and $b_{kj}$. Flip-flops $X_5$ and $X_6$ will be used for temporary storage during each multiplication, $X_5$ containing carries and $X_6$ containing the partial product.

The matrix multiplication routine is written in outline form since all the routines to be used have been described in previous sections. Any modifications, however, are noted; and the execution time, T, required for each step is given. Matrix A is $m x n$, matrix B is $n x p$, and all matrix elements have $b$ bits.

(1) Find $mp$ empty cell groups. Mark $Y_{m+2}=1$ and store a unique $i, j$ pair in each. $T=6mp\tau$.

(2) Set index register $k$ to 0, and clear $X_2$ flip-flops in all marked cell groups. $T=3\tau$.

(3) Set index registers $i$ and $j$ to 0, and increase $k$ by 1.

(4) Increase $i$ by 1.

(5) Load element $a_{ik}$ into all marked cell groups containing $i$ in $X_1$ flip-flops. If $i=m$ go to 6; otherwise, go to 4. $T=11\tau$.

(6) Increase $j$ by 1.

(7) Load element $b_{kj}$ into all marked cell groups containing $j$ in $X_1$ flip-flops. If $j=p$ go to 8; otherwise, go to 6. $T=11\tau$.

(8) Perform the $k$th multiplication, except for the final carry ripple, in all marked cell groups. No marking of complements is necessary since element values need not be saved. $T=(23b+21)\tau$.

(9) Add carries and partial product to sum of previous products in all marked cell groups. If $k=n$ go to 10; otherwise, go to 3. $T=(b+20)\tau$.

(10) All marked cell groups contain an element of C. Read elements out, one by one. $T=(6mp+4)\tau$.

It is to be understood that the above-described arrangements are illustrative of the application of the principles of the invention. Numerous other arrangements may be devised by those skilled in the art without departing from the spirit and scope of the invention. For example, two-dimensional memory is attractive from the standpoint of speed in applications where the Gauss-Jordan procedure is used. These applications include solving systems of linear equations, inverting nonsingular matrices, and solving linear programming problems. The memory's ability to find extreme values by a parallel search makes it particularly attractive in linear programming applications.

What is claimed is:

1. An associative memory comprising a plurality of identical cells, means for applying signals simultaneously to each of said cells, each cell comprising a plurality of data storage registers, means for comparing the content of said data storage registers with said applied signals, means for indicating the cell activity condition, and means enabled by the concurrent receipt of signals from said activity indicating means and said comparing means for propagating signals between adjacent cells.

2. An associative memory comprising a plurality of identical cells, means for storing each unit of a multi-unit data word in a different one of said cells, means for applying signals simultaneously to each of said cells, means for simultaneously comparing said applied signals with the contents of said cells, means for marking certain of said cells in accordance with the result of said comparison, and means for performing arithmetic operations on any pair of stored words having each pair of corresponding data units stored adjacently in the same cell, said operations being performed in parallel on each of said pairs of data units stored in said marked cells.

3. An associative memory comprising a plurality of storage cells, each of said cells having a plurality of data storage registers, means for storing a multiunit data word in parallel in a series of said cells, each unit of data being stored in a corresponding register of a distinct cell, and means for performing arithmetic operations in parallel on any pair of words comprising means for simultaneously comparing the individual units of one of said pair with the corresponding units of the other of said pair, said pair of words being stored adjacently in said memory.

4. An associative memory comprising a first array of identical cells, a second array of identical cells each associated with a distinct group of said first array cells, said cells each containing a plurality of registers for storing data units, means for applying input data signals simultaneously to each of said second array cells, means for controlling the storage of said input data signals in preselected second array cells, and means for transferring each of said stored data units to a preselected register in a distinct cell in the associated group of first array cells.

5. A memory comprising first and second arrays of storage cells, means for activating one of said second array cells, means for storing a data pattern in said active cell comprising means for applying consecutive units of said data pattern simultaneously to each of said second array cells, and means for transferring said stored data pattern from said active cell to a corresponding group of said first array cells.

6. A memory in accordance with claim 5, wherein each of said cells comprises a plurality of data storage registers, said data pattern being stored in a plurality of said active cell registers, and wherein said transferring means comprises means for directing the unit of data stored in each active cell register to a distinct one of said first array cells in said corresponding group.

7. A memory in accordance with claim 6, wherein said second array cells comprise means for directing the unit of data received therein to a predetermined one of said data storage registers.

8. A memory comprising first and second arrays of cells, each cell comprising data register means, each first array cell having certain of said data register means in common with a corresponding second array cell, means for storing data in said register means in one of said second array cells, and means including said common register means for transferring said stored data from said second array cell to said register means other than said common register means in each of a plurality of said first array cells.

9. A memory in accordance with claim 8, wherein said data register means comprises individual registers each capable of storing a unit of data, said one of said second array cells storing a series of data units forming a data word and said plurality of first array cells each being arranged to receive one unit of the data word stored in said one of said second array cells.

10. An associative memory comprising a two-dimensional arrangement of data storage cells, each cell in one dimension having register means in common with register means in a corresponding cell in the other dimension, means for transferring data between adjacent cell register means in each dimension, and means for transferring data from cell register means in one dimension to cell register means in the other dimension.

11. An associative memory in accordance with claim 10, wherein the cells in one dimension are arranged in distinct groups, each cell in the other dimension being associated with one of said distinct groups.

12. An associative memory in accordance with claim 11, wherein said register means comprises data storage registers, each cell in said memory comprising at least one of said registers common to both dimensions, said common register in each cell in one of said groups comprising one of said second dimension cells.

References Cited

UNITED STATES PATENTS

| | | | |
|---|---|---|---|
| 2,947,478 | 8/1960 | Lentz et al. | 340—172.5 |
| 3,031,650 | 4/1962 | Koerner | 340—174 |
| 3,185,965 | 5/1965 | Lee | 340—172.5 |
| 3,230,512 | 1/1966 | Seeber et al. | 340—172.5 |
| 3,247,489 | 4/1966 | Sussenguth | 340—172.5 |
| 3,261,000 | 7/1966 | Behnke | 340—172.5 |
| 3,284,779 | 11/1966 | Lee et al. | 340—172.5 |
| 3,106,698 | 10/1963 | Unger | 340—172.5 |
| 3,141,964 | 7/1964 | Fleisher et al. | 235—175 |
| 3,239,818 | 3/1966 | Petersen et al. | 340—172.5 |
| 3,287,702 | 11/1966 | Borck et al. | 340—172.5 |
| 3,287,703 | 11/1966 | Slotnick | 340—172.5 |
| 3,292,159 | 12/1966 | Koerner | 340—172.5 |

ROBERT C. BAILEY, *Primary Examiner.*

J. P. VANDENBURG, PAUL J. HENON, *Assistant Examiners.*